(12) United States Patent
Worsham, II et al.

(10) Patent No.: US 10,890,668 B2
(45) Date of Patent: Jan. 12, 2021

(54) SYSTEM AND METHOD FOR DETERMINING A VELOCITY OF A ROTORCRAFT

(71) Applicant: Textron Innovations Inc., Providence, RI (US)

(72) Inventors: Robert Earl Worsham, II, Weatherford, TX (US); Charles Eric Covington, Colleyville, TX (US); Thomas Wayne Brooks, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 231 days.

(21) Appl. No.: 16/022,455

(22) Filed: Jun. 28, 2018

(65) Prior Publication Data
US 2020/0003908 A1 Jan. 2, 2020

(51) Int. Cl.
*G01S 19/52* (2010.01)
*B64C 13/50* (2006.01)
*G01C 21/16* (2006.01)
*G01S 19/14* (2010.01)

(52) U.S. Cl.
CPC ............ *G01S 19/52* (2013.01); *B64C 13/503* (2013.01); *G01C 21/16* (2013.01); *G01S 19/14* (2013.01)

(58) Field of Classification Search
CPC .......... G01S 19/52; G01S 19/14; G01S 19/43; B64C 13/503; B64C 27/08; G01C 21/16; G05D 1/0858; G05D 1/101; G01P 5/00

USPC ............................................ 342/357.35, 357
See application file for complete search history.

(56) References Cited

U.S. PATENT DOCUMENTS

| | | | | |
|---|---|---|---|---|
| 5,301,112 A | * | 4/1994 | Gold .................... | G05D 1/0858 244/17.13 |
| 5,535,278 A | * | 7/1996 | Cahn ....................... | G01S 19/24 380/274 |
| 6,264,146 B1 | * | 7/2001 | Hill ....................... | B64C 13/042 244/234 |
| 9,562,788 B1 | * | 2/2017 | Jinkins .................. | G01S 13/953 |
| 2007/0010920 A1 | * | 1/2007 | Lebrun ................ | G05D 1/0858 701/11 |
| 2008/0262728 A1 | * | 10/2008 | Lokshin .................. | G01S 19/48 701/472 |
| 2017/0106986 A1 | * | 4/2017 | Sweeny ................ | B64C 39/024 |
| 2018/0276475 A1 | * | 9/2018 | Podradchik .......... | G08G 5/0078 |

* cited by examiner

*Primary Examiner* — Bernarr E Gregory
*Assistant Examiner* — Alexander L. Syrkin
(74) *Attorney, Agent, or Firm* — Slater Matsil, LLP

(57) ABSTRACT

A rotorcraft includes a flight control computer (FCC), a GPS receiver configured to calculate a groundspeed based on a first carrier signal, and an attitude and heading reference system (AHRS) configured to determine an acceleration of the rotorcraft. The AHRS is operable to receive an indication of the groundspeed from the GPS receiver and to calculate a velocity of the rotorcraft based on the indication of the groundspeed and the acceleration. The FCC is operable to receive an indication of the velocity from the AHRS, to generate the flight control device control signal according to the indication of velocity, and to send a flight control device control signal to one or more flight control devices.

20 Claims, 5 Drawing Sheets

SYSTEM AND METHOD FOR DETERMINING A VELOCITY OF A ROTORCRAFT

TECHNICAL FIELD

The present invention relates generally to a system and method for a flight control, and, in particular embodiments, to a system and method for determining the velocity of a rotorcraft.

BACKGROUND

Fly-by-wire systems in aircraft, as opposed to mechanically controlled systems, use electronic signals to control the flight surfaces and engines in the aircraft. For example, instead of having the pilot controls mechanically linked to the control surfaces via a hydraulic system, the pilot controls are electronically linked to a flight computer, which, in turn, controls flight surface actuators via electronic signals. By further interfacing the flight computer to aircraft sensors, sophisticated control algorithms may be used to provide autopilot functionality, as well as to stabilize and control the aircraft.

While fly-by-wire systems have become commonplace in commercial and civilian fixed wing aircraft, their adoption among rotorcraft, such as helicopters, has been much slower. However, by adopting fly-by-wire systems in helicopters, safer operation may be achieved in difficult flight environments such as low speed, low altitude, degraded visual environments and inclement weather. Another area in which fly-by-wire systems may benefit rotorcraft is in the reduction in pilot workload. By providing automated features such as stabilization in response to wind, control axis decoupling, position hold and heading hold functionality, the pilot is freed up to focus on the environment in which he or she flies.

SUMMARY

An embodiment method of operating a rotorcraft includes receiving a GPS carrier signal by a GPS sensor, determining a groundspeed of the rotorcraft based on a received frequency of the GPS carrier signal, receiving acceleration data from an inertial sensor, determining a velocity based on the groundspeed and the acceleration data, determining an actuator command based on the velocity, and controlling a flight control device according to the actuator command. In an embodiment, determining the groundspeed of the rotorcraft includes determining a first received frequency of the GPS carrier signal, comparing the first received frequency with a reference frequency to determine a Doppler shift, and determining the groundspeed according to the Doppler shift. In an embodiment, the inertial sensor includes an attitude and heading reference system (AHRS) operable to determine the velocity based on the groundspeed and the acceleration data. In an embodiment, the method further includes a flight control computer (FCC) operable to receive an indication of the velocity from the AHRS and operable to determine the actuator command based on the velocity. In an embodiment, determining the velocity includes processing the groundspeed and the acceleration data using a complementary filter. In an embodiment processing the groundspeed and the acceleration data using a complementary filter includes integrating the acceleration data. In an embodiment, determining the velocity further includes processing GPS position data using the complementary filter. In an embodiment, the method further includes transmitting the actuator command to an actuator of the rotorcraft.

An embodiment flight control system for a rotorcraft includes a flight control computer (FCC) operable to control one or more flight control devices of the rotorcraft and an attitude and heading reference system (AHRS) communicatively connected to the FCC. The AHRS includes a processor and a non-transitory computer readable storage medium with an executable program stored thereon. The executable program includes instructions for receiving groundspeed data from a GPS, receiving acceleration data, processing the groundspeed data and the acceleration data using a complementary filter to generate velocity data, and transmitting the velocity data to the FCC, wherein the FCC is operable to control the one or more flight control devices of the rotorcraft according to the velocity data. In an embodiment, the groundspeed data is determined from a measured frequency of a GPS signal. In an embodiment, the acceleration data is received from an inertial sensor of the AHRS. In an embodiment, the complementary filter includes a low-pass filter used to filter the groundspeed data and a high-pass filter used to filter the acceleration data. In an embodiment, the low-pass filter is a second-order low-pass filter. In an embodiment, the executable program further includes instructions for transmitting the acceleration data to the FCC, wherein the FCC is operable to control the one or more flight control devices of the rotorcraft according to the acceleration data.

An embodiment rotorcraft includes a flight control computer (FCC), a GPS receiver configured to detect a first carrier signal and calculate a groundspeed based on the first carrier signal, the GPS receiver coupled to the FCC, an attitude and heading reference system (AHRS) configured to determine an acceleration of the rotorcraft, the AHRS coupled to the GPS receiver system and to the FCC, wherein the AHRS is operable to receive an indication of the groundspeed from the GPS receiver and to calculate a velocity of the rotorcraft based on the indication of the groundspeed and the acceleration, and one or more flight control devices coupled to the FCC and operable to control a flight parameter of the rotorcraft in response to a flight control device control signal received from the FCC, wherein the FCC is operable to receive an indication of the velocity from the AHRS, to generate the flight control device control signal according to the indication of velocity, and to send the flight control device control signal to the one or more flight control devices. In an embodiment, the flight control device signal maintains the rotorcraft in a hover mode. In an embodiment, the flight control device signal maintains a predetermined velocity of the rotorcraft. In an embodiment, the GPS receiver is configured to determine position data based on a second carrier signal and is configured to calculate a groundspeed based on the first carrier signal when unable to determine position data based on the second carrier signal. In an embodiment, the AHRS is operable to calculate a velocity of the rotorcraft using a first filter applied to the indication of the groundspeed and a second filter applied to the acceleration. In an embodiment, the AHRS is operable to calculate a velocity of the rotorcraft using a complementary filter comprising the first filter and the second filter.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
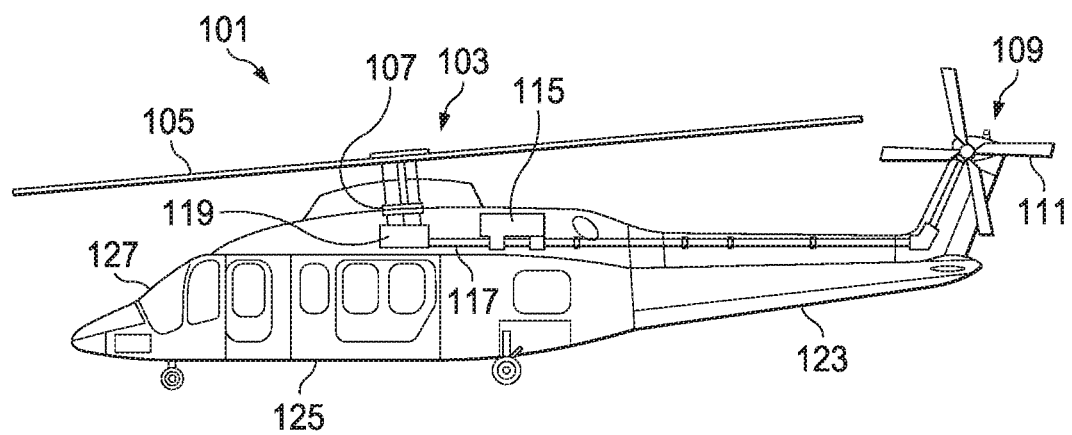
FIG. 1 illustrates an embodiment rotorcraft.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective causes increased power to the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system uses the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the present disclosure will be described with respect to preferred embodiments in a specific context, namely a system and method for determining a velocity of a rotorcraft. Aspects of the system and method include using an on-board Global Positioning System (GPS) to provide groundspeed data to the flight control system of a rotorcraft. For example, the GPS may determine the groundspeed from a Doppler shift of a GPS carrier frequency. The groundspeed data provided by the GPS may be combined with acceleration data from on-board inertial sensors to determine an estimate of the rotorcraft's velocity that is provided to the rotorcraft's flight control system. For example, the groundspeed data may be combined with acceleration data in a complementary filter to calculate an estimate of rotorcraft velocity. The acceleration data may be provided by the rotorcraft's attitude/heading reference system (AHRS), and the estimate of velocity may be calculated within the AHRS. By using data from a GPS to determine groundspeed, a separate sensor or unit on the rotorcraft for determining groundspeed is not needed. Additionally, by combining groundspeed data from a GPS with acceleration data from an AHRS as described herein, the estimate of the rotorcraft's velocity may be more responsive to changes. In this manner, the flight control system may be able to respond more rapidly to changes in rotorcraft velocity and thus may improve stability of the rotorcraft.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control the flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize the flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2:
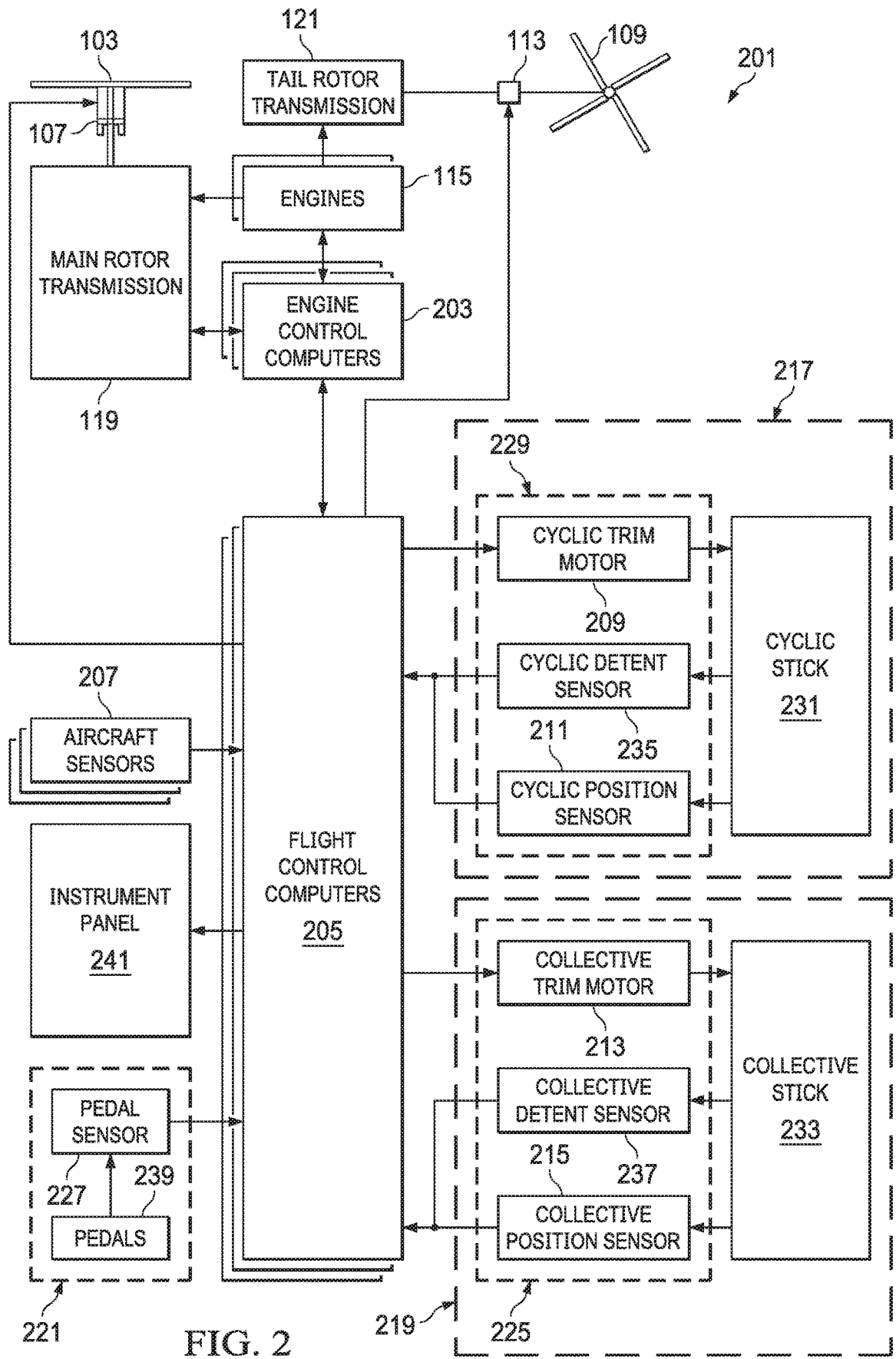
FIG. 2 illustrates a block diagram of an embodiment rotorcraft flight control system.

FIG. 2 illustrates a fly-by-wire flight control system 201 for a rotorcraft according to some embodiments. A pilot may manipulate one or more pilot flight controls in order to control the flight of the rotorcraft. The pilot flight controls may include manual controls such as a cyclic stick 231 in a cyclic control assembly 217, a collective stick 233 in a collective control assembly 219, and pedals 239 in a pedal assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce the workload of the flight crew, and the like. The flight control system 201 includes engine control computers (ECCUs) 203, flight control computers 205, and aircraft sensors 207, which collectively adjust the flight control devices.

The flight control system 201 has one or more flight control computers 205 (FCCs). In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such a measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, vertical speed, and the like. The aircraft sensors 207 may include, for example, an attitude/heading reference system (AHRS) that includes accelerometers, gyroscopes, magnetometers, and other sensors or systems that determine the attitude, velocity, and acceleration of the rotorcraft on its various axes. An AHRS may also process data received from its sensors or other sensors. In some cases, multiple AHRS may be present to provide redundancy. Other sensors 207 could include sensors relying upon data or signals originating external to the rotorcraft, such as a global positioning system (GPS) sensor, a VHF Omnidirectional Range sensor, Instrument Landing System (ILS), and the like. It should be understood that embodiments of the present invention may be directed toward systems that utilize other satellite-based navigation systems such as the Russian global navigation satellite system (GLONASS), the Chinese BeiDou system, the European Galileo system and the Indian NAVIC system.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic control stick 231. In some embodiments, the cyclic control stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic control stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective control stick 233 in the collective control assembly 219. In some embodiments, the collective control stick 233 is a single control stick that moves along a single axis or with a lever type action. A collective position sensor 215 detects the position of the collective control stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective control stick 233. Similar to the determination of the suggested cyclic stick position, in some embodiments, the FCCs 205 determine a suggested collective stick position for the collective control stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or another tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like and provide feedback signals indicative of such to the FCCs. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
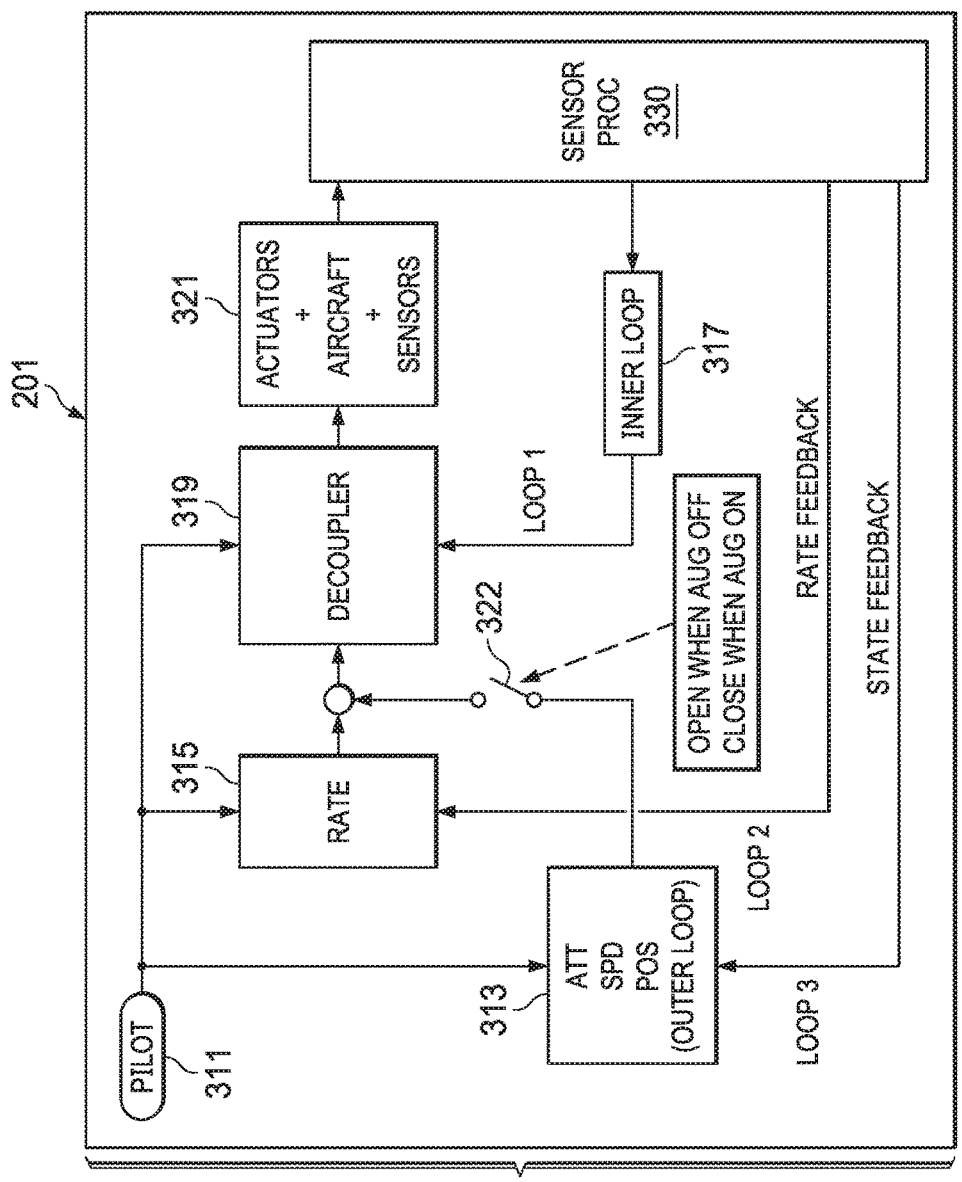
FIG. 3 illustrates a block diagram of an embodiment flight control system.
Figure 3:
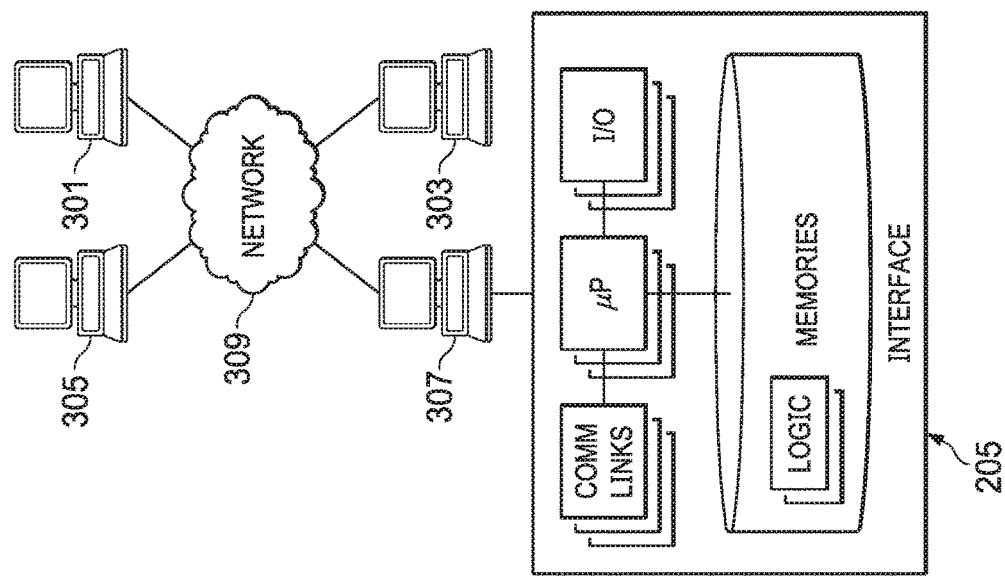

Moving now to the operational aspects of flight control system 201, FIG. 3 illustrates in a highly schematic fashion, a manner in which flight control system 201 may implement FBW functions as a series of interrelated feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 121, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner loop 317 and rate loop 315 include a set of gains and filters applied to data received from roll/pitch/yaw 3-axis rate gyro and acceleration feedback sensors. The sensors may be similar to the sensors 207. The data from some sensors may be provided by an AHRS, and some additional gains or filters may be applied to the AHRS data by the AHRS. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain. In some embodiments, data produced by sensors within aircraft equipment 321 are conditioned by sensor processing block 330. Sensor processing block 330 may reformat and rescale data to make the sensor data compatible with flight control algorithms, provide dynamic pre-filtering of the sensor signals, perform coordinate transformations of GPS location data from Earth axis coordinates to rotorcraft body coordinates, or perform other processes on sensor data.

Figure 4:
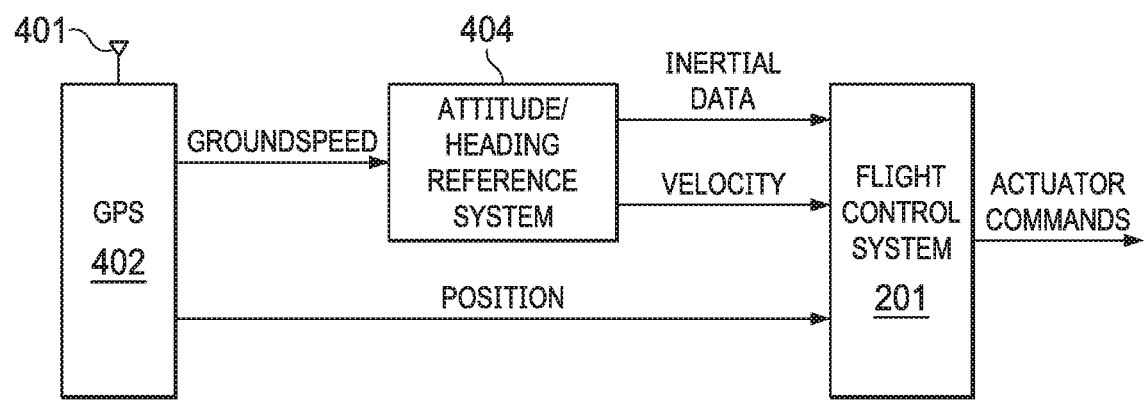
FIG. 4 illustrates a block diagram showing an embodiment GPS, an attitude/heading reference system, and a flight control system.

FIG. 4 illustrates a block diagram showing a functional relationship between a GPS 402, an AHRS 404, and a flight control system 201 of a rotorcraft according to an embodiment. As shown, GPS 402 provides position data to flight control system 201. GPS 402 also provides groundspeed data to AHRS 404, discussed in greater detail below. AHRS 404, in turn, provides inertial data and velocity data to flight control system 201. During operation, sensor processing block 330 of flight control system 201 may process the position data from GPS 402 and the velocity and inertial data from AHRS 404 for use by the flight control system 201 to determine adjustments to the flight control devices.

GPS 402 includes antenna 401 and is configured to determine a position and a groundspeed based on signals received from GPS satellites. High-resolution position data is determined based on signals received from at least four GPS satellites, while groundspeed data may be determined using fewer satellites. The functionality of GPS system 402 may be determined by the GPS system 402 itself, by flight control system 201, or by AHRS 404. For example, if flight control system 201 determines that the received GPS data is in the wrong format, is outside of expected parameters, is too noisy, or is otherwise unrecognizable, flight control system 201 may designate the incoming position data as being not usable. In some embodiments, GPS 402 may be a subsystem of an avionics or autopilot system, such as a Garmin Integrated Avionics (GIA) system, that also provides various flight instrumentation, data processing and radio functionality in addition to determining GPS position and groundspeed measurements.

GPS 402 may calculate a groundspeed of the rotorcraft by analyzing the carrier frequencies or the pulse widths of the received GPS signals. For example, groundspeed may be determined from measurements of the Doppler shifts of the carrier frequencies transmitted by multiple GPS satellites. Generally, the Doppler shift involves a change in frequency (or perceived frequency) of a waveform generated by one body and observed by a second body which is allowed to move relative to the first body. To an approximation, the Doppler shift is proportional to the relative velocities of the two bodies along the direction between the two bodies. For example, if the two bodies are moving toward each other, the frequency observed by the second body appears to be higher than the actual frequency. If the two bodies are moving apart, the frequency will appear lower. Since the GPS receiver knows the nominal frequency of a particular GPS carrier signal and can very accurately measure the received frequency, a relative velocity between the satellite and the GPS receiver can be determined based on these two frequencies. A Doppler shift may be determined using other techniques, such as using measurements of phase shifts of the carrier signals. Multiple relative velocities determined from multiple GPS signals can be used to determine a groundspeed of the rotorcraft. In some cases, this technique may have a faster response than other techniques, such as calculating a groundspeed by taking a time derivative of position.

In some embodiments, AHRS 404 may also provide data processing functionality and include interface circuitry between GPS 402 and flight control system 201. In various embodiments, data communications between AHRS 404, GPS 402 and flight control system 201 operate according to the ARINC-429 avionics data bus standard. Alternatively, other bus standards could be used according to the particular system and its specifications.

In various embodiments, the groundspeed determined by GPS 402 is sufficiently accurate to use as a measurement of rotorcraft velocity during steady state conditions. However, for dynamic conditions, such as windy conditions in which the rotorcraft is rapidly being pushed back and forth, the response time that it takes GPS 402 to determine a change in groundspeed may be slower than desired. In some embodiments, AHRS 404 may be configured to estimate a velocity based on adjusting the groundspeed determined by GPS 402 using the output of on-board accelerometers and other sensors. For example, AHRS 404 may provide more responsive velocity data to the flight control system 201 by combining the relatively long-term groundspeed measurements provided by GPS 402 with relatively short-term estimates of the velocity determined from the acceleration as measured by inertial sensors of AHRS 404. In some embodiments, the groundspeed measurements from GPS 402 may be combined with the acceleration measurements from AHRS 404 using a complementary filter. For example, the velocity may be determined by filtering groundspeed measurements using a high-pass filter and filtering integrated acceleration measurements using a low-pass filter, and then summing the filtered groundspeed measurements and the filtered and integrated acceleration measurements together.

Figure 5:
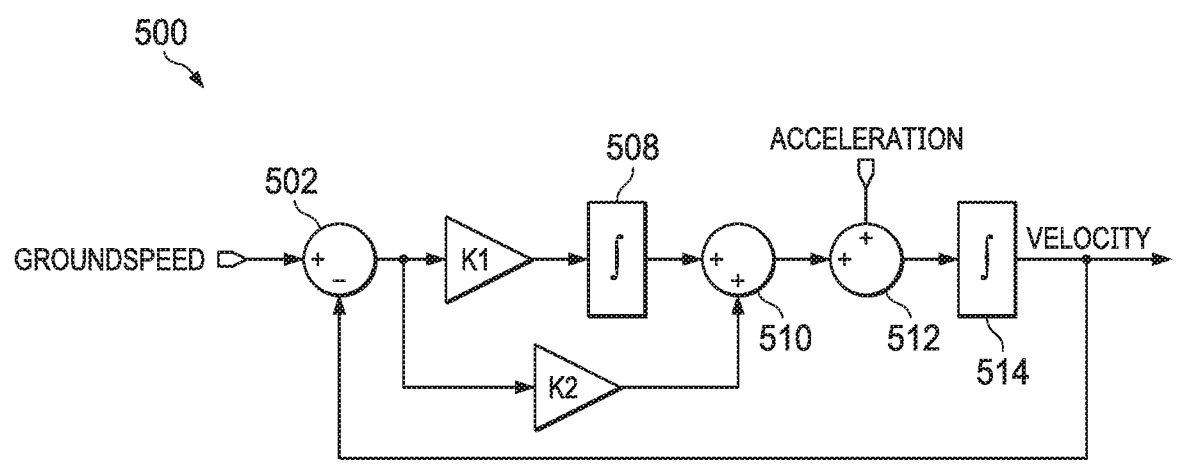
FIG. 5 illustrates a block diagram of an embodiment complementary filter used to estimate a velocity of the rotorcraft.

As an example, FIG. 5 illustrates a block diagram of embodiment complementary filter 500 that may be used by AHRS 404 to estimate a velocity of the rotorcraft based on a groundspeed determined by GPS 402 and acceleration measurements made by inertial sensors of AHRS 404. In an embodiment, the forward path for the groundspeed is represented using gains K1 and K2, integrators 508 and 514 and summing block 510 that provides a feedforward path for gain K2. In some embodiments, the forward path for the groundspeed acts as a low-pass filter. In some cases, the forward path may act as a first-order low-pass filter, a second-order low-pass filter, or another type of filter. The forward path for the acceleration is represented using integrator 514 and summing block 512, and the output estimated velocity is fed back via subtraction block 502. In some embodiments, the forward path for the acceleration acts as a high-pass filter. The dynamic response of the complementary filter 500 is such that the effect of the measured acceleration on the estimated velocity dominates at higher frequencies, while the effect of the groundspeed determined by GPS 402 on the estimated velocity dominates at lower frequencies. In some embodiments, the dynamic response of complementary filter 500 may be set such that:

$K1=\omega^2$ and
$K2=2\zeta\omega$, where $\omega$ is the natural frequency and $\zeta$ is the damping factor. In some embodiments, gain K1 may be a value between about 4.0E-4 and about 0.64, and gain K2 may be a value between about 0 and 1.0, though the values may be different in other embodiments. Gains K1 and K2 may be may be configured for different values, for example, depending on a specific application or the characteristics of the system. Complementary filter 500 may be implemented in a variety of ways using digital and/or analog signal processing techniques known in the art. For example, integrators 508 and 510 may be implemented using accumulators, gains K1 and K2 may be implemented using multipliers and summing blocks 510 and 512 and subtraction block 502 may be implemented using adders. In some embodiments, these functions are implemented by a processor that executes software code. It should also be appreciated that complementary filter 500 is just one example of many possible filter structures that could be used to combine groundspeed data from a GPS and acceleration data from an AHRS to provide an estimate of velocity. Other types of filters may also be used in other embodiments, such as other types of complementary filters, Kalman filters, combinations of filters, filters with other gains, filters with other feedback configurations, or other filters or configurations of filters. In some embodiments, GPS position data may be also be used in determining an estimate of velocity. For example, the time derivative of the GPS position data may be combined with the groundspeed data and the acceleration data. In some cases, other data processing techniques may be included, such as data averaging, data smoothing, noise filtering, etc.

In embodiments of the present invention, a velocity may be derived by monitoring the GPS carrier signals even in cases when GPS position data is not available or the data being transmitted on the GPS carrier is inaccurate or is otherwise unintelligible to the receiver. Using velocity data that is combined with inertial measurements as described herein allows for fast velocity feedback that can be used to stabilize a rotorcraft in dynamic conditions. For example, using GPS carrier signals to determine groundspeed may be faster than using GPS position data to determine groundspeed. For example, in some cases, calculating groundspeed from GPS position data may have a response time of about 3 seconds, but calculating groundspeed from GPS carrier signals may have a response time of about 1 second. By filtering the groundspeed and combining it with filtered acceleration data, a velocity of the rotorcraft may be estimated more rapidly and also have better accuracy. The velocity determined by these techniques may be used by FCCs of the rotorcraft to determine the proper commands to send to flight control devices, while remaining within safe flight conditions. In this manner, the techniques described herein may provide for more stable flight characteristics and reduced pilot workload. The techniques described herein may allow for more stable rotorcraft flight in all flight conditions, including cruising or hover conditions. Additionally, the use of GPS carrier signals to determine groundspeed alleviates the need for a dedicated groundspeed sensor or unit on the rotorcraft. This may reduce weight and system complexity due because less wiring, groundspeed sensor logic, and other supporting features may be required.

Figure 6:
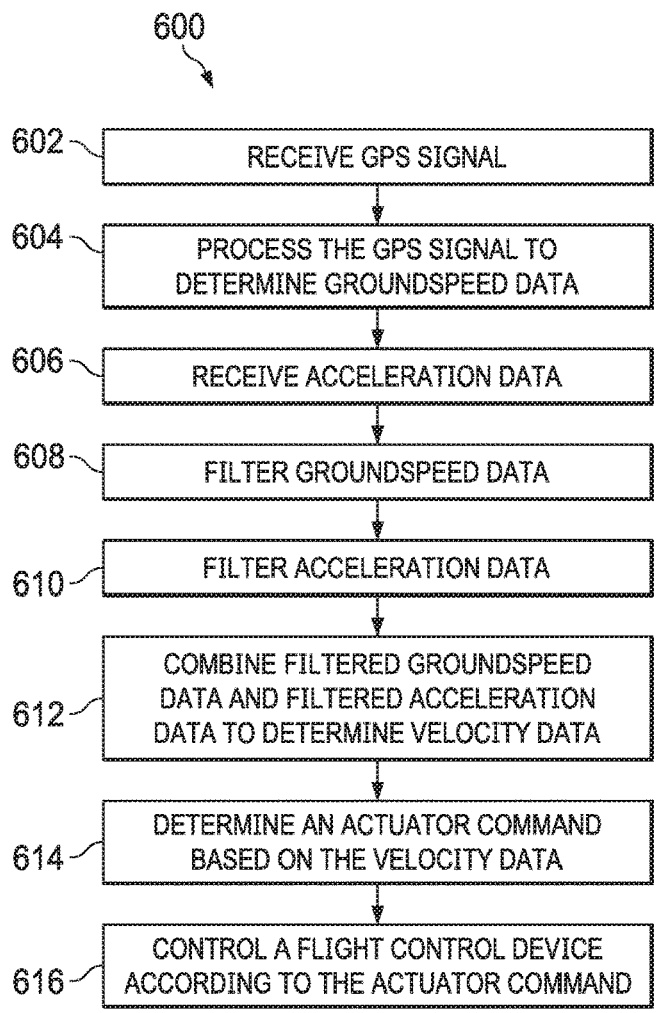
FIG. 6 is a flow diagram illustrating a method of determining a velocity of a rotorcraft.

FIG. 6 is a flow diagram illustrating a method 600 of determining a velocity of a rotorcraft according to some embodiments. Initially, a GPS signal may be received by a GPS of the rotorcraft in block 602. The GPS signal may, for example, be a GPS carrier signal received from a GPS satellite. In block 604, the GPS signal is processed to determine groundspeed data. The GPS signal may be processed to determine a measured frequency of the GPS signal, and that measured frequency may be compared with a reference frequency. Groundspeed data indicating a groundspeed of the rotorcraft may be determined from a difference between the measured frequency and the reference frequency. The GPS signal may be processed by the GPS.

In block 606, acceleration data is received. The acceleration data may indicate an acceleration of the rotorcraft. In some embodiments, an AHRS of the rotorcraft receives acceleration data from inertial sensors. The groundspeed data is filtered in block 608. In some embodiments, the groundspeed data may be filtered using a low-pass filter, and may be filtered by an AHRS of the rotorcraft. The groundspeed data may be filtered as part of additional processing, and more than one type of filter may be used. The acceleration data is filtered in block 610. In some embodiments, the acceleration data may be filtered using a high-pass filter, and may be filtered by an AHRS of the rotorcraft. The acceleration data may be filtered as part of additional processing, and more than one type of filter may be used.

In block 612, the filtered groundspeed data and the filtered acceleration data are combined to determine velocity data. The velocity data may indicate a velocity of the rotorcraft. In some embodiments, the filtered groundspeed data and the filtered acceleration data are combined by the AHRS to determine the velocity data. In some embodiments, the filtered groundspeed data and filtered acceleration data may be combined using a complementary filter. The complementary filter may also perform the filtering of block 608 and block 610. Combining the filtered groundspeed data and the filtered acceleration data may include integrating the acceleration data.

In block 614, an actuator command is determined based on the velocity data. In some embodiments, an FCC of the rotorcraft uses the velocity data to determine the actuator command. The FCC may use the velocity data to determine an actuator command in order to adjust a flight parameter of the rotorcraft. In block 616, a flight control device is controlled according to the actuator command. The actuator command may be sent by the FCC to one or more flight control devices to adjust flight parameters of the rotorcraft. The fight control devices move or change based on the actuator command to adjust the flight parameters, and resulting flight, of the rotorcraft.

Figure 7:
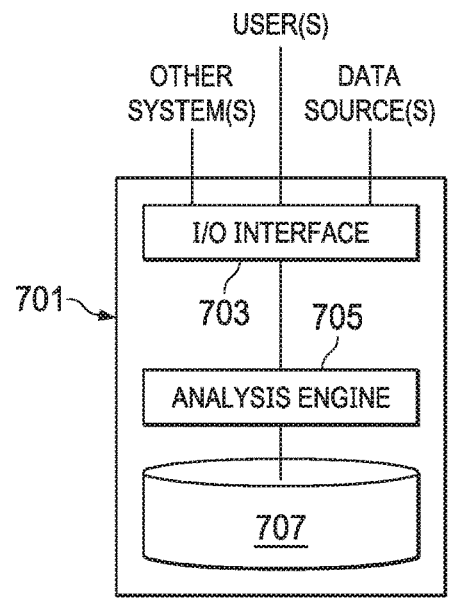
FIG. 7 illustrates a computer system that may be used to implement embodiment control algorithms.

FIG. 7 illustrates a computer system 701. The computer system 701 can be configured for performing one or more functions with regard to the operation of the flight control system 201 as described herein. Further, any processing and analysis can be partly or fully performed by the computer system 701. The computer system 701 can be partly or fully integrated with other aircraft computer systems or can be partly or fully removed from the rotorcraft. In some embodiments, the computer system 701 may process groundspeed data and acceleration data in a complementary filter to determine an estimate of velocity, which may be similar to techniques described previously.

The computer system 701 can include an input/output (I/O) interface 703, an analysis engine 705, and a database 707. Alternative embodiments can combine or distribute the I/O interface 703, the analysis engine 705, and the database 707, as desired. Embodiments of the computer system 701 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multipurpose machines, for example computer workstations, that are suitable for also performing other tasks.

The I/O interface 703 can provide a communication link between external users, systems, and data sources and components of the computer system 701. The I/O interface 703 can be configured for allowing one or more users to input information to the computer system 701 via any known input device. Examples can include a keyboard, mouse, touch screen, and/or any other desired input device. The I/O interface 703 can be configured for allowing one or more users to receive information output from the computer system 701 via any known output device. Examples can include a display monitor, a printer, cockpit display, and/or any other desired output device. The I/O interface 703 can be configured for allowing other systems to communicate with the computer system 701. For example, the I/O interface 703 can allow one or more remote computer(s) to access information, input information, and/or remotely instruct the computer system 701 to perform one or more of the tasks described herein. The I/O interface 703 can be configured for allowing communication with one or more remote data sources. For example, the I/O interface 703 can allow one or more remote data source(s) to access information, input information, and/or remotely instruct the computer system 701 to perform one or more of the tasks described herein.

The database 707 provides persistent data storage for the computer system 601. Although the term "database" is primarily used, a memory or other suitable data storage arrangement may provide the functionality of the database 707. In alternative embodiments, the database 707 can be integral to or separate from the computer system 701 and can operate on one or more computers. The database 707 preferably provides non-volatile data storage for any information suitable to support the operation of the flight control system 201, including various types of data discussed further herein. The analysis engine 705 can include various combinations of one or more processors, memories, and software components.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a rotorcraft, the method comprising:
   receiving a GPS carrier signal by a GPS sensor of the rotorcraft;
   determining, by the GPS sensor, a groundspeed of the rotorcraft based on a Doppler shift of a received frequency of the GPS carrier signal;
   receiving, by an attitude and heading reference system (AHRS) of the rotorcraft, acceleration data from an inertial sensor of the AHRS;

receiving, by the AHRS, an indication of groundspeed from the GPS sensor;
determining, by the AHRS, a velocity based on the groundspeed and the acceleration data;
receiving, at a flight control computer (FCC) of the rotorcraft, an indication of the velocity from the AHRS, determining, by the FCC, an actuator command based on the velocity; and
transmitting, by the FCC, the actuator command to a flight control device of the rotorcraft to control the flight control device according to the actuator command.

2. The method of claim 1, wherein determining the groundspeed of the rotorcraft comprises:
determining, by the GPS sensor, a first received frequency of the GPS carrier signal;
comparing, by the GPS sensor, the first received frequency with a reference frequency to determine a Doppler shift; and
determining, by the GPS sensor, the groundspeed according to the Doppler shift.

3. The method of claim 1, wherein determining the velocity comprises:
processing the groundspeed and the acceleration data using a complementary filter.

4. The method of claim 3, wherein processing the groundspeed and the acceleration data using a complementary filter comprises integrating the acceleration data.

5. The method of claim 3, wherein determining the velocity further comprises processing GPS position data using the complementary filter.

6. A flight control system for a rotorcraft comprising:
a flight control computer (FCC) operable to control one or more flight control devices of the rotorcraft;
a GPS operable to determine a groundspeed of the rotorcraft; and
an attitude and heading reference system (AHRS) communicatively connected to the FCC and to the GPS, the AHRS comprising:
a processor and a non-transitory computer readable storage medium with an executable program stored thereon, the executable program including instructions for:
receiving groundspeed data from the GPS;
receiving acceleration data;
processing the groundspeed data and the acceleration data using a complementary filter to generate velocity data; and
transmitting the velocity data to the FCC, wherein the FCC is operable to control the one or more flight control devices of the rotorcraft according to the velocity data.

7. The flight control system of claim 6, wherein the groundspeed is determined by the GPS from a measured frequency of a GPS signal.

8. The flight control system of claim 6, wherein the acceleration data is received from an inertial sensor of the AHRS.

9. The flight control system of claim 6, wherein the complementary filter comprises a low-pass filter used to filter the groundspeed data and a high-pass filter used to filter the acceleration data.

10. The flight control system of claim 9, wherein the low-pass filter is a second-order low-pass filter.

11. The flight control system of claim 6, wherein the executable program further includes instructions for transmitting the acceleration data to the FCC, wherein the FCC is operable to control the one or more flight control devices of the rotorcraft according to the acceleration data.

12. A rotorcraft comprising:
a flight control computer (FCC);
a GPS receiver configured to detect a frequency of a first carrier signal and calculate a groundspeed based on a Doppler shift of the frequency of the first carrier signal, wherein the GPS receiver is coupled to the FCC;
an attitude and heading reference system (AHRS) configured to determine an acceleration of the rotorcraft, wherein the AHRS is coupled to the GPS receiver and to the FCC, wherein the AHRS is operable to receive an indication of the groundspeed from the GPS receiver and to calculate a velocity of the rotorcraft based on the indication of the groundspeed and the acceleration; and
one or more flight control devices coupled to the FCC and operable to control a flight parameter of the rotorcraft in response to a flight control device control signal received from the FCC;
wherein the FCC is operable to receive an indication of the velocity from the AHRS, to generate the flight control device control signal according to the indication of velocity, and to send the flight control device control signal to the one or more flight control devices.

13. The rotorcraft of claim 12, wherein the flight control device signal maintains the rotorcraft in a hover mode.

14. The rotorcraft of claim 12, wherein the flight control device signal maintains a predetermined velocity of the rotorcraft.

15. The rotorcraft of claim 12, wherein the GPS receiver is configured to determine position data based on a second carrier signal and is configured to calculate a groundspeed based on the first carrier signal when unable to determine position data based on the second carrier signal.

16. The rotorcraft of claim 12, wherein the AHRS is operable to calculate a velocity of the rotorcraft using a first filter applied to the indication of the groundspeed and a second filter applied to the acceleration.

17. The rotorcraft of claim 16, wherein the AHRS is operable to calculate a velocity of the rotorcraft using a complementary filter comprising the first filter and the second filter.

18. The method of claim 1, wherein the FCC is part of a fly-by-wire (FBW) system for controlling the rotorcraft, and the actuator command is determined based on control laws of the FBW system.

19. The method of claim 1, wherein the flight control device is controlled according to the actuator command to maintain a velocity of the rotorcraft.

20. The method of claim 12, wherein the rotorcraft is a fly-by-wire (FBW) rotorcraft, and wherein the flight control device control signal is generated according to the FBW control laws.

* * * * *